May 20, 1958      F. A. McDONALD      2,835,273
MANIFOLD VALVE WITH SELECTIVE BY-PASS ROTOR
Filed Sept. 8, 1953      3 Sheets-Sheet 2
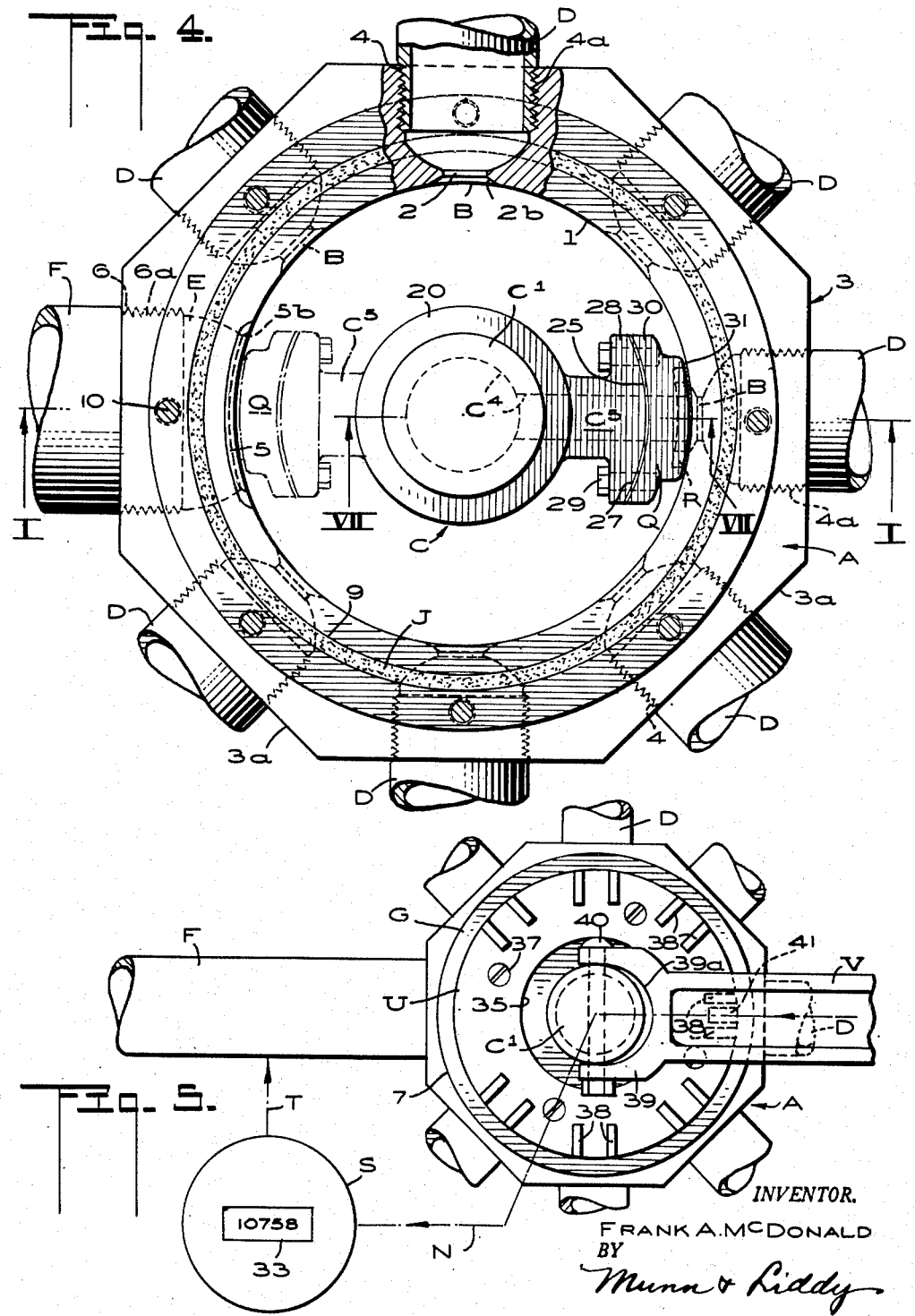
INVENTOR.
FRANK A. McDONALD
BY
Munn & Liddy
ATTORNEYS May 20, 1958        F. A. McDONALD        2,835,273
MANIFOLD VALVE WITH SELECTIVE BY-PASS ROTOR
Filed Sept. 8, 1953        3 Sheets-Sheet 3
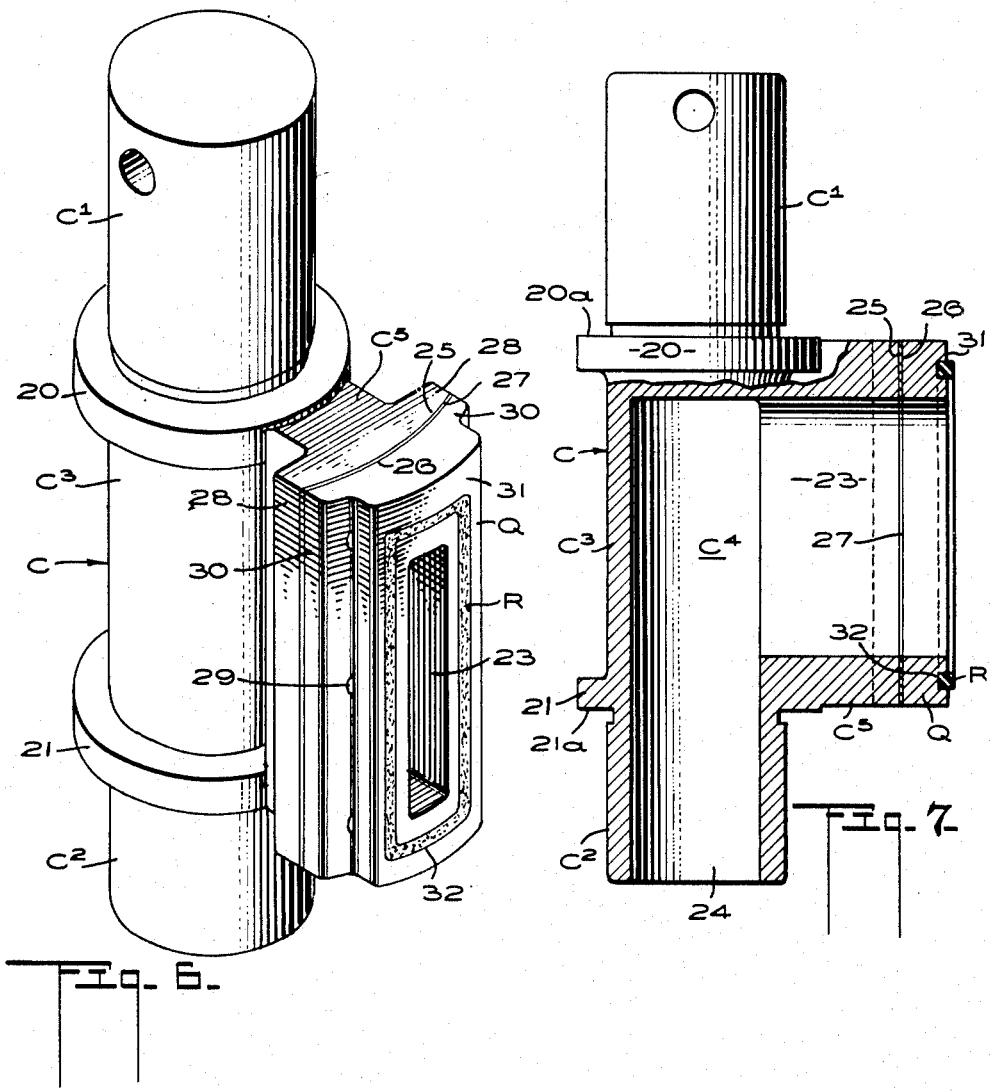
INVENTOR
FRANK A. McDONALD
BY Munn & Liddy
ATTORNEYS

United States Patent Office 2,835,273
Patented May 20, 1958

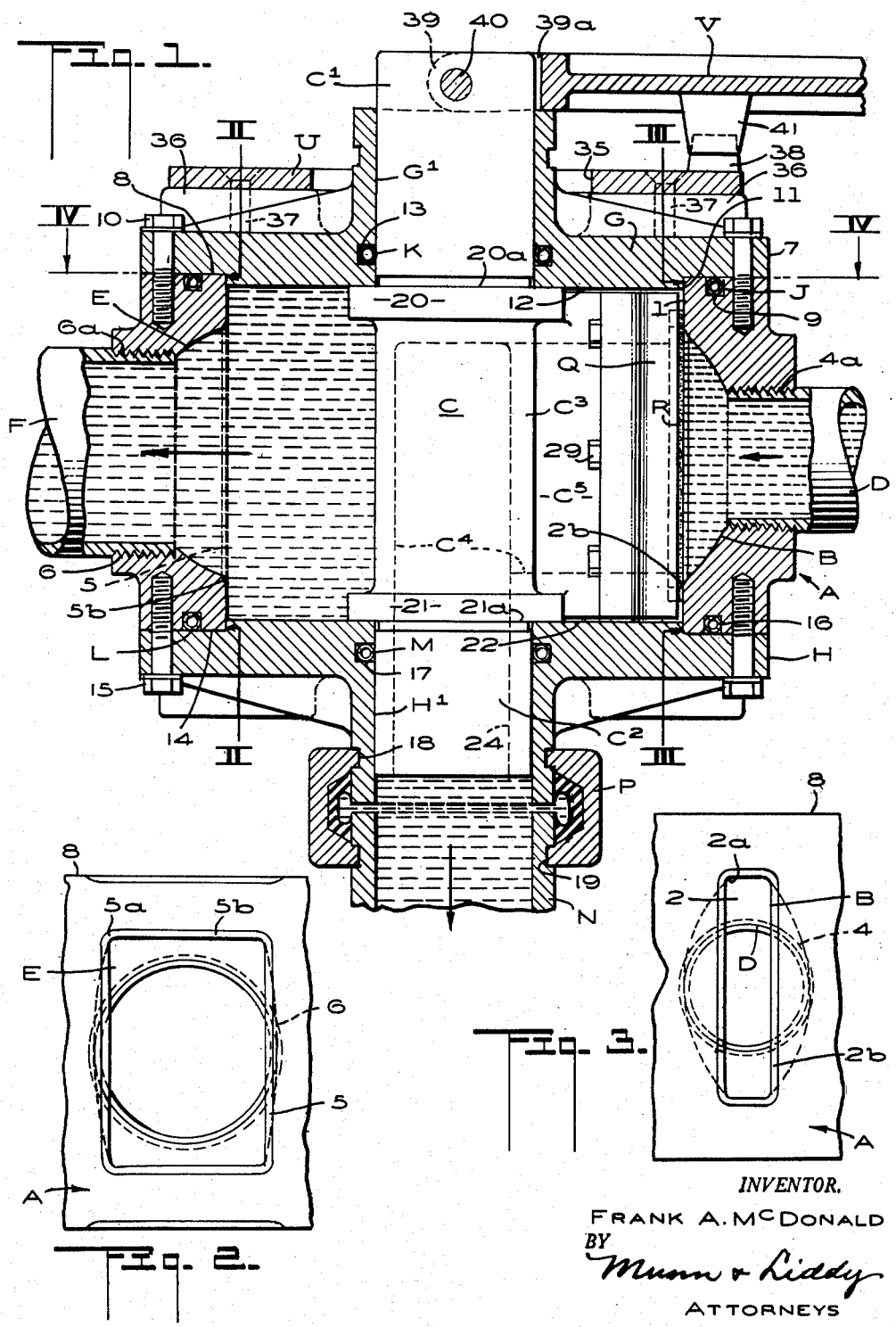

2,835,273

MANIFOLD VALVE WITH SELECTIVE BY-PASS ROTOR

Frank A. McDonald, San Francisco, Calif.

Application September 8, 1953, Serial No. 378,777

2 Claims. (Cl. 137—625.11)

An object of my invention is to provide an improvement over the patent of William Roderick Dand on a multiple inlet valve, issued February 14, 1944, Patent Number 2,341,531; and over my own patent on a variable diameter rotor for manifold valve, issued January 2, 1951, Patent Number 2,536,199. In Patent Number 2,341,531, a multiple inlet valve is shown with a selective rotor that may be manually moved into registration with any desired one of a number of inlets for connecting this inlet with the common outlet for the valve. The rotor closes all of the inlets not being used.

In Patent Number 2,536,199, a variable diameter rotor for the manifold valve is disclosed. The rotor is in the form of a split cylinder and has yielding adjustable means for yieldingly urging the wings of the rotor against the inner cylindrical surface of the stator for maintaining a liquid-tight contact between the rotor and the stator at all times regardless of temperature variations. This prevents liquid passing from any of the sealed off inlets in the stator and flowing between the opposed walls of the rotor and stator and entering into the rotor passage. The operator is assured that only liquid from the selected inlet will pass through the rotor passage and into the common valve outlet while all of the other inlets will remain effectively sealed off by the rotor.

The two patented manifold valves have been designed to be used on trucks where gasoline, kerosene, etc., is to be dispensed. The present manifold valve has a selective by-pass rotor and is an improvement over the patented manifold valves. This manifold valve is designed to be used in an oil field where several oil-conveying pipes are to connect with a common pipe. In present day oil fields, there may be several oil wells in the field owned by different persons and the oil from these wells is to be pumped into a common storage tank that receives oil from all or a certain number of the wells in the field. It is desirable that the oil pumped from the different wells be not hindered in its flow to the storage tank and yet it is necessary that the amount of oil pumped from each well be checked from time to time so that the individual owning the well can have a record of the quantity of oil pumped from his well.

It is the practice to check the quantity of oil flowing from one well for a given time period such as twenty-four hours, while permitting the oil from other wells to flow unchecked to the storage tank. Another well is checked for a second period of time equal in length to the first checking period, and this is carried on until all of the wells are successively checked, whereupon the well that was originally checked, is checked again. Whether any well is being checked or not as to the quantity of oil being pumped, the flow of oil from all of the wells must not be hindered.

The problem has been solved by providing a manifold valve with a plurality of inlets and a common outlet that is in communication with all of the inlets except one, all of the time so that the oil from all the inlets can flow to the common outlet unhindered. I provide a selective by-pass rotor for the manifold valve that can be swung into communication with any one of the inlets to receive all of the oil from that particular inlet. The oil that enters the by-pass rotor is delivered to a metering device that will record the quantity of oil flowing therethrough and then the by-passed oil will be returned to the same pipe that receives the oil from the common outlet for the valve.

I have shown the present manifold valve as being provided with seven inlet ports and one outlet port that receives oil from all of the inlet ports, except the one that is in communication with the selective by-pass rotor. I do not wish to be confined to any particular number of inlet ports for the manifold valve because the number can be increased or decreased without departing from the spirit and scope of the invention.

Each inlet port for the manifold valve is connected by a pipe to a well from which oil is being pumped. The selective by-pass rotor has its inlet adapted to register with any desired inlet port and has its outlet communicating with a conventional meter that will record the quantity of oil passing therethrough. A pipe leads from the meter and conveys the oil to the pipe that receives oil from the common outlet port of the manifold valve. In this way the oil flowing into all of the inlet ports of the manifold valve is unhindered even though the oil from any desired one of the inlet ports is being by-passed through a conventional meter before being returned to the common outlet pipe.

The outlet port is made larger in area than the inlet ports so that it will carry the oil flow from all of the inlet ports unimpeded. Furthermore, the flow of oil into the outlet port will not be stopped as the selective by-pass rotor is moved thereby because the outlet port is larger than the inlet ports. This is an important feature of the invention.

Although the manifold valve has been designed especially for checking the quantity of oil flowing from any particular oil well without impeding the flow of oil from the well, the valve could be used for other purposes and could handle liquids other than oil. If there are more oil wells in the oil field than there are inlets to the valve, either the manifold valve could be increased in size to provide more inlet ports, or another manifold valve could be used and have its inlet ports connected to the additional wells. The outlet ports for each valve could then be connected to a common pipe leading to the storage tank or each outlet pipe could communicate directly with the storage tank or other point where the oil is to be delivered.

In the present invention, I show manual selective means for rotating the rotor to register with any desired inlet port in the stator. In a copending application on an automatic control for manifold valve with selective by-pass rotor, Ser. No. 399,672, filed December 22, 1953, which has now matured into Patent No. 2,806,486, there is disclosed, electrical means for rotating the selective by-pass rotor to another inlet port after a predetermined time period.

Other objects and advantages will appear in the following specification, and the novel features of the device will be particularly pointed out in the appended claims.

My invention is illustrated in the accompanying drawings forming a part of this application, in which:

Figure 1 is a transverse section through the valve stator and is taken along the line I—I of Figure 4, the selective by-pass rotor being shown in elevation;

Figure 2 is a transverse section taken along the line II—II of Figure 1, and illustrates the outlet port;

Figure 3 is a transverse section taken along the line

III—III of Figure 1, and illustrates one of the inlet ports;

Figure 4 is a top plan view of the valve and the selective by-pass rotor with the stator cover removed, and is taken along the line IV—IV of Figure 1;

Figure 5 is a top plan view of the valve and manual operating handle for the selective by-pass rotor, and illustrates diagrammatically the coupling of a meter between the outlet for the rotor and the pipe communicating with the valve casing outlet;

Figure 6 is an isometric view of the selective by-pass rotor; and

Figure 7 is a vertical section through a portion of the selective by-pass rotor to show the passage extending therethrough.

In carrying out my invention, I provide a stator indicated generally at A in Figures 1 and 4. The stator has a cylindrical inner surface as shown at 4 and this surface is provided with a plurality of inlet ports indicated severally at B. I show seven inlet ports in Figure 4, although I do not wish to be confined to any exact number.

The inner end of one of these inlet ports B is illustrated in Figure 3. It will be seen from this figure that the inlet port B has a rectangular opening 2 with rounded corners 2a. In Figure 4 each of the inlet ports B shows the rectangular opening 2 as being provided with bevelled sides 2b and this is done so as to effect a better communication between any one of the inlet ports and a passage C4 in a selective by-pass rotor indicated generally at C, as will be described hereinafter more fully.

The outer surface 3 of the stator A is preferably made in the shape of an octagon. The eight sides of the octagon are made flat and there is an inlet port B associated with each one of seven of the eight sides. The inlet port B is altered in its shape from a rectangular opening 2 on the inner cylindrical surface 1 of the stator A, see Figure 3, to a round opening 4 on the outer flat surface 3a of the stator. Each of the cylindrical portions 4 of the inlets B, is tapped or threaded at 4a and receives an inlet pipe D. Each of these inlet pipes D is in communication with an oil well, not shown, from which oil is being pumped. If the device is used for another purpose, the pipes D would communicate with the sources of liquid that is to be carried through the pipes.

The body A has an outlet port indicated generally at E in Figures 1, 2 and 4. A longitudinal section through the outlet port is illustrated in Figure 1 and an inner face view of the same port is illustrated in Figure 2. The inner end of the outlet port E is made rectangular in shape as shown at 5 in Figure 2, but it will be noted by comparing Figure 2 with Figure 3 that the rectangular opening 5 is considerably wider than the rectangular opening 2 for the inlet port B. The purpose for this will be described hereinafter.

The rectangular opening 5 for the outlet port E is provided on the cylindrical inner surface 1 of the stator A and the rectangular opening has rounded corners 5a and bevelled sides 5b. The outlet port E has its shape altered from a rectangular opening on the inner cylindrical surface 1 of the body A to a cylindrical opening 6 on the face 3a of the body. The cylindrical opening 6 is tapped or threaded at 6a and a common outlet pipe F for all of the inlet pipes D, is screwed into this opening. It will be seen from both Figures 1 and 4 that the diameter of the outlet pipe F is larger than the diameter of any one of the inlet pipes D.

It is now best to refer to Figure 1 where I show a cover G for the stator A and a base plate H for the same stator. In order to reduce the cost of manufacture, both the cover and base plate are made identical in size and shape, and therefore a detailed description of one will suffice for both. The cover G has an annular flange 7 that bears against the top surface 8 of the stator body A. The top surface 8 has a circular groove 9 therein and this groove receives a sealing gasket such as an O ring J.

Cap screws 10 removably secure the cover G to the top of the stator.

The flange 7 of the cover G projects beyond an annular shoulder 11 provided on the cover, and this shoulder bears against the top of the circular inner wall 1 of the stator A. The inner face 12 of the cover G is bounded by the annular shoulder 11 and constitutes a bearing surface for one portion of the selective by-pass rotor C, as will be described hereinafter. The cover G also has a cylindrical bearing G1 that rotatably receives a cylindrical portion C1 of the selective by-pass rotor C. The cylindrical bearing G1 has an annular groove 13 for receiving an O ring K that bears against the cylindrical portion C1 and makes a liquid-tight seal therewith.

As already stated, the base plate H is of the same size and shape as the cover G and this base plate is secured to the bottom surface 14 of the stator A by cap screws 15 that are similar to the cap screws 10. An O ring L is received in a circular groove 16 provided in the bottom surface 14 of the stator A, and acts as a seal between the base plate H and the stator body. The base plate has a cylindrical bearing H1 that is similar in size and shape to the cylindrical bearing G1 for the cylindrical portion C1, and an O ring M is received in an annular groove 17 provided in the inner surface of the cylindrical bearing H1 for bearing against a cylindrical depending projection C2, for making a liquid-tight seal therewith.

It will be noted that cylindrical bearing H1 is provided with an annular groove 18 on its outer surface, see Figure 1. A by-pass pipe N has a diameter of the same size as the cylindrical bearing H1 and the pipe M has an annular groove 19. The pipe M is connected to the cylindrical bearing H1 by what is known as a Victaulic coupling P, or any other type of liquid-tight coupling may be used for this purpose, such as the Grunvagrip.

It is best now to describe the particular construction of the selective by-pass rotor C and set forth how it is operatively mounted in the stator A. An isometric view of the selective by-pass rotor C is illustrated in Figure 6 and a partial vertical section of the same rotor is illustrated in Figure 7. As already stated, the selective by-pass rotor C has an upper cylindrical portion C1 and a lower cylindrical portion C2. These two cylindrical portions C1 and C2 are axially aligned and extend from the main body C3 of the rotor. Annular flanges 20 and 21 are placed at the junctures of the cylindrical portions C1 and C2 with the main body C3. The flange 20 has its upper surface 20a, see Figure 7, designed to bear against the inner face 12 of the cover, see Figure 1, while the annular flange 12 has a bearing surface 21a designed to bear against an inner face 22 of the base plate H, which corresponds to the inner face 12 of the cover G. The selective by-pass rotor C when thus mounted, can be rotated within the stator A so as to bring an entrance opening 23 of a passage C4 into registration with any one of the inlet ports B.

In order to accommodate for any wear between the entrance opening 23 of the passage C4 in the selective by-pass rotor C and the inner cylindrical surface 1 of the stator A, I provide a shoe indicated generally at Q, in Figures 6 and 7, that is removably secured to the selective by-pass rotor C adjacent to its entrance opening 23. The passage C4 in the rotor C is L-shaped and this passage not only has the entrance opening 23, but has an exit opening 24 that extends downwardly throughout the entire length of the lower cylindrical portion C2. The entrance opening 23 is rectangular in cross section and the transversely extending portion C5 that contains this opening has its outer end curved as at 25, the center for the radius of this surface being positioned at the axis of the rotor C. The shoe Q has a concave surface 26 and this concave surface is of the same shape as the convex surface 25 on the transversely extending portion C5. One or more shims 27 is placed between the surfaces 25 and 26 to permit adjustment of the shoe Q with respect to the transversely extending portion C5 and the proper positioning of the shoe with respect to the inner cylindrical surface 1 of the stator A. As wear takes place, additional shims 27 may be added.

The portion C5 of the rotor C, has laterally extending flanges 28 projecting from opposite sides thereof, see Figure 4. Screws 29 secure the shoe Q to the portion C5 of the rotor. The shoe has flanges 30 on its opposite vertical sides that receive the screws 29. The arcuate outer face 31 of the shoe Q is disposed a slight distance away from the inner cylindrical surface 1 of the stator A and Figure 6 shows this face as being provided with a groove 32. The groove is rectangular in shape to surround the opening in the shoe, and an O-ring R is mounted in the groove and is designed to contact with the cylindrical inner surface 1 of the stator to make a liquid-tight fit therewith. The rotor may be swung into a position to align the entrance opening 23 of the L-shaped passage C4 with the desired inlet opening B in the stator A, and the O-ring R or gasket will act as a seal between the rotor and the stator so all of the fluid flowing in the inlet pipe D, connected with the rotor C, will flow into the entrance opening 23 of the rotor and out through the outlet opening 24.

Should the rotor be swung so as to move the laterally-extending portion C5 by the outlet port in the stator, as indicated by the dot-dash line in Figure 4, it will be seen that the width of the outer convex surface 31 of the shoe Q is less than the width of the rectangular opening 5 and therefore the fluid from the inlet pipes D that enters the interior of the stator A, will continue to flow through the outlet pipes F. At no time will the outlet pipe F be closed.

Before describing the operation of the valve, it is best to describe one manual means for rotating the rotor C into the desired position. In Figures 1 and 5, I illustrate a disc-like ring U that has an opening 35 for receiving the cylindrical upstanding bearing G1 on the cover G. The cover has integral upstanding bosses 36 that support the disc-ring U and screws 37 or other suitable fastening means, secures the disc-ring to the bosses in a fixed position.

The disc-ring U has pairs of upstanding lugs 38, see Figures 1 and 5, and these register with the inlet pipes D. A handle V has a bifurcated end 39 forming a recess 39a that receives a portion of the cylindrical member C1 that projects above the top of the cylindrical bearing G1. A bolt 40 pivotally connects the bifurcated end 39 of the handle with the cylindrical member C1. A lug 41 depends from the handle V and is adapted to enter the recesses provided between any pair of lugs 38.

In both Figures 1 and 5, the lug 41 on the handle is shown resting between a pair of lugs 38 that overlie the inlet pipe D shown partially in section in Figure 1. Therefore, the fluid flowing through this pipe will enter the L-shaped passage C4 in the rotor C. When it is desired to connect any other inlet pipe D with the passageway C4 in the rotor, the handle V is lifted upwardly and will swing about the pivot bolt 40 until the depending lug 41 on the handle clears the tops of the pair of lugs 38 which had received the lug. The handle V may now be swung for rotating the rotor C into a position to connect its passage C4 with a desired inlet pipe D. This is ascertained by bringing the depending lug 41 into a position directly above the desired pair of lugs 38, whereupon the handle V may be lowered until the lug 41 is received within the space provided by the selected pair of lugs. The rotor C will now be connected to the desired inlet pipe D.

From the foregoing description of the various parts of the device, the operation thereof may be readily understood.

The manifold valve illustrated in Figure 4 can accommodate seven inlet pipes D, which in turn can communicate with seven different oil wells or other sources of liquid. The oil delivered from the wells will flow through the pipes D and enter the interior of the stator A and then will flow out through the outlet pipe F unimpeded. The selective by-pass rotor C can be swung into a communicating position with any one of the desired inlet ports B in the manner described, and the oil or fluid from this port will pass through the passageway C4 of the rotor and then flow out through the by-pass outlet pipe N.

The pipe N is illustrated schematically in Figure 5 and this pipe will convey the oil to a conventional fluid-measuring meter S. A recording device 33 on the meter will register the quantity of fluid passing through the rotor C. Figure 5 also indicates schematically a pipe T connecting the meter S with the outlet pipe F. In this way the by-passed oil or fluid will move back into the main stream of oil that is flowing through the outlet pipe F to the storage tank.

The selective by-pass rotor C can be swung to any inlet port B desired and remain connected to the port for a protracted period of time, such as a full day of twenty-four hours. It is then possible to swing the rotor C so that another inlet port B will be connected and the quantity of oil going through this port will be recorded by the meter S. The oil will flow from each of the wells through the inlet pipes D and then will flow on out through the outlet pipe F without hindrance while one of the pipes D will have its oil pass through the meter S to check the quantity of oil pumped for a predetermined time period such as twenty-four hours. Periodic checkings of the various wells as to the quantity of oil being pumped can in this way be accomplished.

While I have shown only the preferred form of my invention, it should be understood that various changes or modifications may be made within the scope of the appended claims without departing from the spirit and scope of the invention.

I claim:

1. A valve of the type described comprising: a stator having a closed interior with a cylindrical-shaped inner wall; the wall having a plurality of inlet ports rectangular in shape and all of the same height and width; the tops of the ports lying in one plane that extends at right angles to the axis of the cylindrical wall and the bottom of the ports lying in a second plane that parallels the first plane; said wall also having a rectangular outlet port whose upper and lower edges lie in said parallel planes; said outlet port having a width considerably wider than the width of the inlet ports so that the outlet port can receive all of the fluid from the inlet ports; and a selective by-pass rotor rotatably mounted in the stator and having a passageway with a rectangular opening of the same size and shape as the stator inlet ports; the upper and lower edges of the rotor entrance opening lying in the said upper and lower parallel planes; and the width of the rotor body at its entrance opening being slightly wider than the width of said opening; thereby a portion of the stator outlet port will always be exposed to the stator interior as the rotor entrance opening is moved past the stator outlet port during a portion of the rotation of the rotor.

2. The combination as set forth in claim 1: and in which portions of the stator, bordering the two sides of the rectangular entrance opening, are recessed along the entire height of the sides so that fluid in the stator interior will be free to flow across both recesses to enter the stator outlet port during that portion of the stator rotation when the rotor entrance opening is moving across the outlet port.

References Cited in the file of this patent

UNITED STATES PATENTS

| | | |
|---|---|---|
| 825,370 | Zurbuch | July 10, 1906 |
| 940,920 | Burhorn | Nov. 23, 1909 |
| 1,791,923 | Eule | Feb. 10, 1931 |